W. WESTBURY.
DRAWING POT.
APPLICATION FILED JAN. 26, 1916.
1,236,240.
Patented Aug. 7, 1917.
2 SHEETS—SHEET 1.
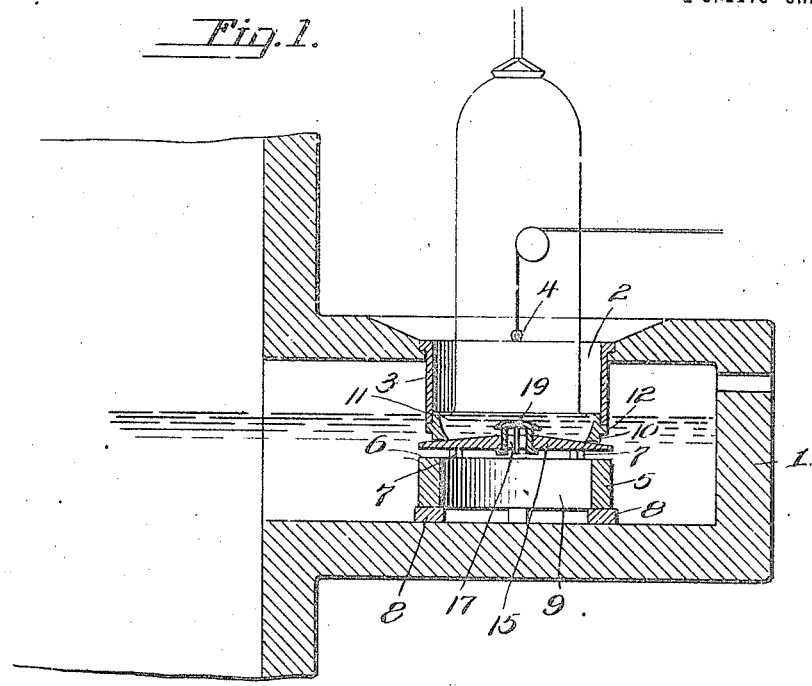
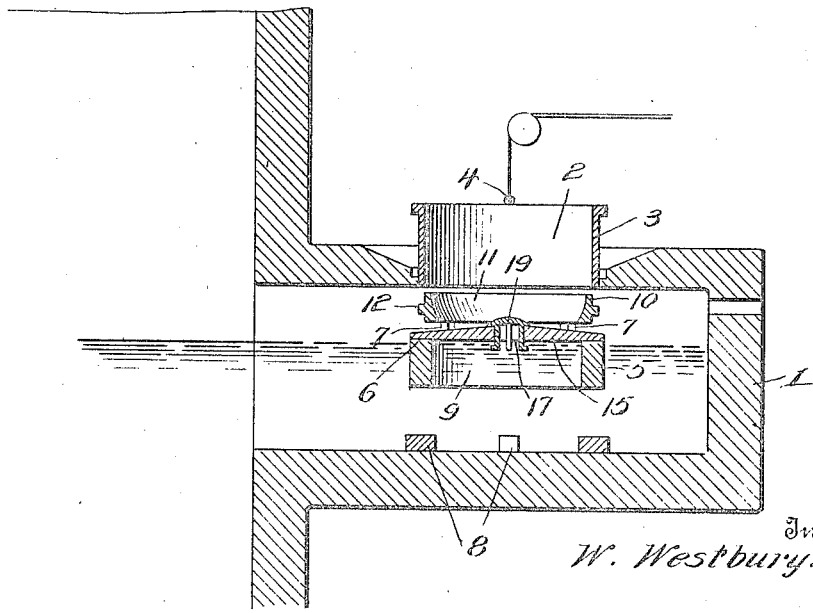
Witnesses
F. C. Gilson.
Inventor
W. Westbury.
By Victor J. Evans
Attorney W. WESTBURY.
DRAWING POT.
APPLICATION FILED JAN. 26, 1916.
1,236,240.
Patented Aug. 7, 1917.
2 SHEETS—SHEET 2.
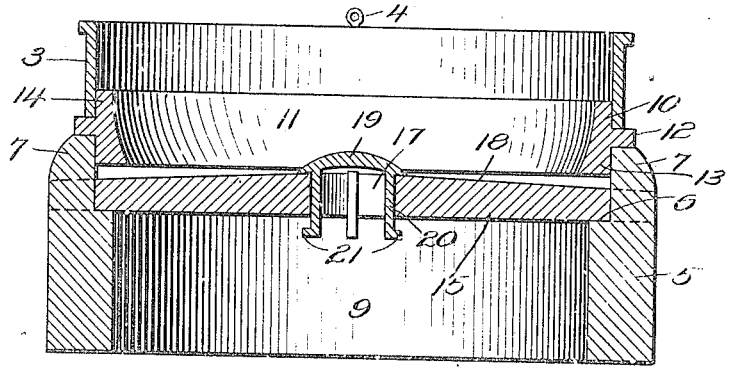
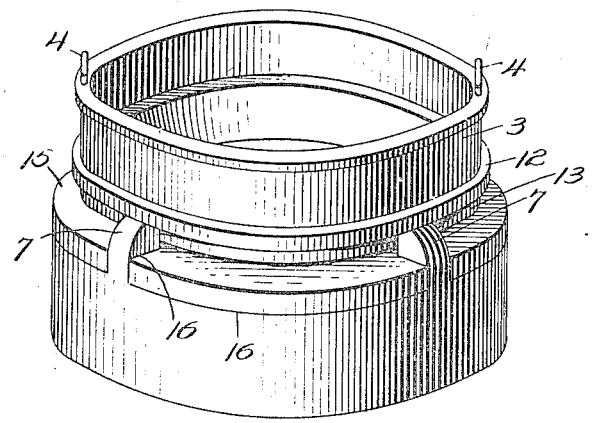
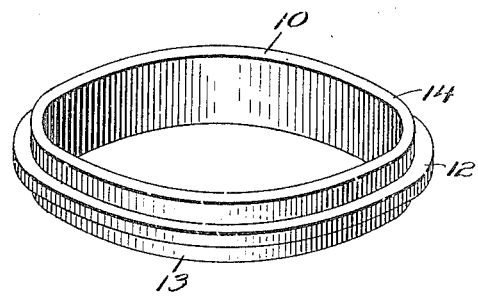
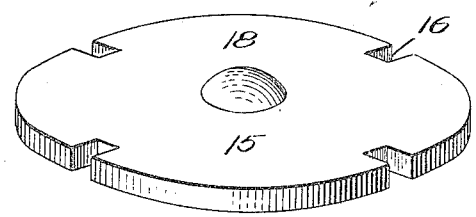
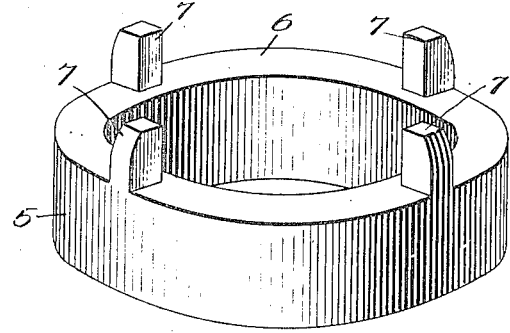
Inventor
W. Westbury.
Witnesses
F. C. Gibson
C. C. Hines
By Victor J. Evans
Attorney

UNITED STATES PATENT OFFICE.

WILLIAM WESTBURY, OF OKMULGEE, OKLAHOMA, ASSIGNOR TO L. S. SKELTON, OF OKMULGEE, OKLAHOMA.

DRAWING-POT.

1,236,240.

Specification of Letters Patent.

Patented Aug. 7, 1917.

Application filed January 26, 1916. Serial No. 74,472.

*To all whom it may concern:*

Be it known that I, WILLIAM WESTBURY, a citizen of the United States, residing at Okmulgee, in the county of Okmulgee and State of Oklahoma, have invented new and useful Improvements in Drawing-Pots, of which the following is a specification.

This invention relates to drawing pots or rings for use in glass drawing apparatus of that kind especially designed for the drawing of glass cylinders employed in the production of window glass, etc.

The object of the invention is to provide a floating pot which is movable over the surface of the bath of liquid glass in the doghouse or other drawing chamber and the furnace tank from which the same is supplied, so as to be disposed in position for the draw and later moved back into the body of the tank for the remelting of the aftermath, and which is of such construction as to insure the presentation of a charge of glass on each drawing operation which is free from impurities and which is adapted for the remelting and drainage off of the aftermath in a reliable and efficient manner.

A further object of the invention is to provide a pot which includes reservoir and drawing chambers which are relatively movable in connection with an interposed relatively movable partition having a feed opening therein for glass supplying and draining off actions and which embodies means for preventing any impure glass or aftermath left as a residue from the draw from draining back into the reservoir chamber.

The invention consists of the features of construction, combination and arrangement of parts hereinafter fully described and claimed, reference being had to the accompanying drawing in which:—

Figure 1 is a vertical section through the working parts of a drawing station, with the pot in position for use and its parts arranged for a drawing action.

Fig. 2 is a similar view showing the parts of the pot as they appear when the pot is arranged for the drainage off of the residuum glass and the melting of the aftermath.

Fig. 3 is a vertical section through the pot *per se* and the guard taken in a plane at an angle to the section shown in Figs. 1 and 2.

Fig. 4 is a perspective view of the parts shown in Fig. 3.

Figs. 5, 6 and 7 are similar views of the component parts of the pot.

Referring to the drawings, 1 designates a doghouse or other glass receptacle at a drawing station, and which is provided in its top with a drawing opening 2 and communicates with a kiln or furnace chamber, not shown, from which it is supplied with molten glass. Arranged for vertical movement within the opening 2 is a guard ring 3 which performs the usual function of protecting the exposed portion of the molten glass and the base portion of the part which is being drawn from the chilling effects of sudden drafts of air. This guard ring is designed in practice to be raised and lowered in any preferred manner, and for this purpose may be provided with eyes 4 for connection with cables or other elements of raising and lowering gear. The ring may be made of metal or fire-clay and is adapted for use in conjunction with the pot as hereinafter fully described.

The pot comprises a bottom ring or cylinder 5, preferably made of fire-clay, said ring or cylinder being open at the bottom and top and provided with an upper rim or seat face 6 and a series of guide posts 7 projecting upwardly therefrom, the said bottom ring is adapted in the drawing operation to be depressed so as to rest upon blocks or supports 8 within the receptacle 1, whereby the downward movement of the pot is limited. In such position of the bottom ring it forms a reservoir chamber 9 to receive a constant supply of the glass from the receptacle sufficiently below the surface of the glass to insure the supply of molten glass in a pure and properly liquid state for transferal to the drawing chamber of the pot.

Disposed above the bottom ring 5 is a floating top ring or section 10 which is in the form of a comparatively shallow annulus and is also preferably made of fire-clay. This upper ring is formed with a bowl-shaped bore 11 constituting a drawing chamber of less depth and diameter than the chamber 9. Surrounding the ring is an external annular flange 12 which is integral therewith and is adapted to serve as a support for the guard ring 3 and also as a stop to limit the downward movement of the said top ring and guard ring. The lower portion 13 of the outer surface of the ring 10 below the flange 12 forms a guide surface which moves in contact with the inner faces of the guide lugs or posts 7 on the bottom ring 5, whereby the top ring is guided in its vertical movements and held from lateral displacement while the upper portion 14 of the outer surface of the ring 10 above the flange 12 forms a portion to receive and fit within the lower edge of the guard ring 3.

The said portion 13 of the top ring is of less depth than the height of the posts 7 and hence the said top ring will be at all times supported in spaced relation above the upper or rim surface 6 of the bottom ring 5. Disposed in this space between the top and bottom rings is a partition disk 15, of fire-clay or other suitable material, which is adapted to form a top wall for the chamber 9 and a bottom wall for the chamber 11. The disk 15 is of a diameter conforming to the diameter of the ring 5 and rests upon the rim surface 6 thereof and is provided in its marginal edge with slots or notches 16 to receive and slidably engage the guide posts 7.

The disk 15 is adapted to float as a unit with the rings 5 and 10 when the pot as a whole is free for a floating action, and is adapted to float at other times independently of the rings for certain controlling functions. The said disk is provided with a central inlet or feed opening 17 for the flow of glass from the chamber 9 to the chamber 11 and has its upper surface 18 sloping from the central opening to its peripheral edge to provide an inclined shelf for the drainage off of the melted aftermath on the exterior of the pot. A gravity closing float valve 19 is provided to close the opening 17 when the pot is in normally elevated position to prevent drainage of any of the used glass in the pot chamber 11 back into the reservoir chamber 9, and this valve is provided with depending guide arms 20 movable within the opening 17 and terminating in laterally projecting stops 21 to limit its upward movement.

Normally the pot floats upon the surface of the body of glass and a number of such pots may be used so that a pot from which a cylinder has been drawn in a drawing station may be moved back into the kiln for the remelting and purification of the aftermath and reheating of the pot while another pot is drawn into the drawing station for use in its place. When so normally arranged the ring 10 lies above the level of the body of glass, which level is slightly below the level of the sloping surface 18 of the partition disk 15, which rests upon the seat surface 6 of the bottom ring 5. When the pot is brought into drawing position and disposed beneath the drawing opening 2, the guard ring 3 is moved downward about the ring 10 and to a sufficient extent to force the entire pot down into the body of glass until the ring 5 rests upon the supports 8. In this operation the pure fresh glass below the surface which is contained in the charge chamber 9 flows upward through the passage 7 into the drawing chamber 11 of the ring 10, the valve 20 opening for its passage, and the chamber 11 in this position of the pot being closed at its bottom by the partition disk 15, which floats up against the surface of the ring 10, and the movement of the valve back to normal position.

While the pot is thus held depressed with the partition elevated and closing the drawing chamber in the upper portion of the pot, the glass cylinder is drawn in the usual manner by means of the drawing tool, and after the cylinder is completely drawn and severed the guard ring 3 is elevated, thus allowing the pot to again float to the level of its normal depth of submergence. The partition 15 then being unsupported by the body of metal drops by gravity back to normal position, thus opening or uncovering the bottom of the chamber 11, which is at this stage exposed to the heat of the kiln above the level of the glass, so that upon the pot being pushed back into the main kiln chamber the aftermath or residuum glass remaining in the chamber 11 will be melted and drained down upon the surface of the plate 15 and outwardly over the sloping face thereof and downwardly upon the exterior of the ring 5. By this means the upper portion of the pot will be freed from all the surplus or hardened glass, which will be prevented by the closing of the valve 20 from flowing back into the chamber 9 and contaminating the fresh and pure glass in said chamber, all of the glass residuum thus being returned to the surface of the body of glass within the kiln by the drainage of the melted residuum glass down upon the outside of the ring 5. Through this action and by reason of the fact that the ring 5 is submerged to such a depth that only highly heated and purified glass can enter the chamber 9, it will be evident that on each drawing operation an adequate supply of pure glass only will be furnished for the drawing action, and the glass left remaining remelted and returned to the body of glass in the kiln, thus preventing any access of impurities to the drawing chamber and lines, smears, blisters and other imperfections in the glass resulting therefrom.

It will be evident from the foregoing that my invention provides a glass drawing pot or ring which fulfils its intended purposes in a ready, reliable and efficient manner, and which may be easily kept in working condition, as owing to the sectional construction of the pot any part which becomes injured or disintegrated may be replaced at a comparatively low cost.

I claim:—

1. A floatable, depressible drawing pot comprising a lower ring forming a storage reservoir, an upper ring forming a storage chamber, and a partition movably mounted between said rings and having a feed opening.

2. A drawing pot having a lower reservoir chamber, an upper drawing chamber, and a partition movably mounted between said chambers and provided with a valved feed opening.

3. A drawing pot comprising a lower ring-shaped body forming a reservoir chamber, an upper ring-shaped body forming a drawing chamber, and a floatable partition movably mounted between said chambers, said partition being provided with a feed opening and an upper drain surface sloping therefrom to its peripheral edge.

4. A floatable, depressible drawing pot comprising a lower ring-shaped body forming a reservoir chamber, an upper ring-shaped body forming a drawing chamber arranged in spaced relation to said lower body, and a movable floating partition between said bodies in guided connection with the lower body and having a feed passage connecting said chambers.

5. A drawing pot comprising a lower ring-shaped body, an upper ring-shaped body supported in spaced relation to the lower body, and a floating partition movably mounted between said bodies and having a feed opening and an upper drain surface.

6. A drawing pot comprising a lower ring-shaped body, an upper ring-shaped body supported in spaced relation to the lower body, a floating partition movable between said bodies and having a feed opening and a drain surface, and a valve controlling said feed opening.

7. A drawing pot comprising a lower shaped body adapted to rest upon said memporting and guide members, an upper ring-shaped body adapted to rest upon said members and to be held thereby in spaced relation to the lower body, a partition mounted for floating movement between said bodies and in guided contact with said members, said partition having a central feed opening and a sloping upper drain surface leading to its periphery, and a valve controlling said opening.

8. A drawing pot comprising a lower ring-shaped body having upstanding supporting and guide members, an upper ring-shaped body provided with an annular flange to rest upon said members and to be held thereby in spaced relation to the lower body, a partition mounted for floating movement between said bodies and in guided contact with said members, said partition having a central feed opening and a sloping upper drain surface leading to its periphery, and a valve controlling said opening.

9. A drawing pot comprising upper and lower separable ring members, forming reservoir and drawing chambers, respectively, and a partition interposed between said members, said members and partition being vertically movable as a unit in the body of glass and said partition being movable independently of and between said members and provided with a feed opening, and a valve governing said feed opening and controlled by the depth of submergence of the pot.

10. A drawing pot comprising upper and lower ring members, forming drawing and reservoir chambers respectively, and a partition interposed between said ring members, said partition and ring members being movable vertically as a unit and said partition movable independently between said ring members, connecting means between said ring members and partition for maintaining the ring members in spaced relation and permitting relative up and down movements of the partition, the partition having a feed opening therein, and a float valve vertically movable in said feed opening and having means for limiting its opening and closing movements.

11. A drawing pot comprising a floatable, depressible body, composed of separable sections, to wit, a lower reservoir section, an upper drawing section, and an interposed partition movable vertically with relation to said sections and having a feed opening and a valve controlling said opening and governed by its depth of submergence in the glass.

12. In a drawing apparatus, the combination of a source of glass supply having a drawing opening, and a vertically movable drawing conduit connecting the body of glass in the source of supply with said drawing opening, said conduit embodying a lower reservoir chamber, an upper drawing chamber, and a movable partition between said chambers having a float-valve-controlled feed opening.

In testimony whereof I affix my signature in presence of two witnesses.

WILLIAM WESTBURY.

Witnesses:
A. L. NIXON,
J. T. PANCOAST.